United States Patent
Chen et al.

(10) Patent No.: US 12,039,805 B2
(45) Date of Patent: Jul. 16, 2024

(54) OFFLINE HANDWRITING INDIVIDUAL RECOGNITION SYSTEM AND METHOD BASED ON THREE-DIMENSIONAL DYNAMIC FEATURES

(71) Applicant: ACADEMY OF FORENSIC SCIENCE, Shanghai (CN)

(72) Inventors: Xiaohong Chen, Shanghai (CN); Xu Yang, Shanghai (CN); Yachen Wang, Shanghai (CN); Nan Wang, Shanghai (CN); Qimeng Lu, Shanghai (CN)

(*) Notice: Subject to any disclaimer, the term of this patent is extended or adjusted under 35 U.S.C. 154(b) by 925 days.

(21) Appl. No.: 16/968,833

(22) PCT Filed: Nov. 29, 2019

(86) PCT No.: PCT/CN2019/122176
§ 371 (c)(1),
(2) Date: Aug. 10, 2020

(87) PCT Pub. No.: WO2021/031445
PCT Pub. Date: Feb. 25, 2021

(65) Prior Publication Data
US 2023/0245501 A1    Aug. 3, 2023

(30) Foreign Application Priority Data
Aug. 22, 2019   (CN) .......................... 201910780141.1

(51) Int. Cl.
*G06V 40/30* (2022.01)
*G06T 7/246* (2017.01)

(52) U.S. Cl.
CPC .......... *G06V 40/388* (2022.01); *G06T 7/246* (2017.01); *G06V 40/376* (2022.01); *G06V 40/394* (2022.01); *G06T 2207/30241* (2013.01)

(58) Field of Classification Search
CPC ......... G06V 40/30–394; G06V 40/388; G06V 40/376; G06T 7/246; G06T 2207/30241
See application file for complete search history.

(56) References Cited

U.S. PATENT DOCUMENTS

| | | | |
|---|---|---|---|
| 6,445,820 B1 * | 9/2002 | Love | G06V 40/30 382/314 |
| 6,633,671 B2 * | 10/2003 | Munich | G06V 40/30 382/187 |
| 2018/0247108 A1 * | 8/2018 | Hong | G06F 3/0488 |

* cited by examiner

Primary Examiner — Casey L Kretzer
(74) Attorney, Agent, or Firm — Clement Cheng

(57) ABSTRACT

The present invention provides an offline handwriting individual recognition system and method. The method comprises: scanning the suspicious handwriting to obtain a first white light image and a first three-dimensional image, and scanning the sample handwriting to obtain a second white light image and a second three-dimensional image; pre-processing the first white light image and the second white light image to obtain a first pre-processed image and a second pre-processed image; extracting a first skeleton image and a second skeleton image from the first pre-processed image and the second pre-processed image; obtaining a first writing trajectory and a second writing trajectory according to the first skeleton image and the second skeleton image; extracting a first dynamic feature, a first three-dimensional feature, and a second dynamic feature, a second three-dimensional feature; processing to obtain a correlation coefficient, and obtaining an individual recognition result.

13 Claims, 5 Drawing Sheets

| Likelihood ratio | Deduction |
|---|---|
| >10000 | Extremely support $H_p$ |
| 1000~10000 | Strongly support $H_p$ |
| 100~1000 | Medially support $H_p$ |
| 10~100 | Moderately support $H_p$ |
| 1~10 | Limitedly support $H_p$ |
| 0.1~1 | Limitedly support $H_d$ |
| 0.01~0.1 | Moderately support $H_d$ |
| 0.001~0.01 | Medially support $H_d$ |
| 0.0001~0.001 | Strongly support $H_d$ |
| <0.0001 | Extremely support $H_d$ |

Figure 2

OFFLINE HANDWRITING INDIVIDUAL RECOGNITION SYSTEM AND METHOD BASED ON THREE-DIMENSIONAL DYNAMIC FEATURES

1. FIELD OF THE INVENTION

The invention relates to the technical field of identity recognition based on behavioral characteristics, and more particularly, to an offline handwriting individual recognition system and method based on three-dimensional dynamic features.

2. DESCRIPTION OF THE RELATED ART

With the development of science and technology, biometrics-based identity recognition technique continues to develop as well. Each individual has a set of measurable, or automatically recognizable and verifiable physiological characteristics or behavioral characteristics, which are unique and specific to them. The physiological characteristics comprise iris, retina, fingerprints and facial features, etc., and the behavioral characteristics comprise gait, voice and handwriting, etc. Offline handwriting individual recognition technique is a technique that the writer of the handwriting is identified by comparing the suspicious handwriting and the sample handwriting, according to a portrait, symbols, and painting shown on the papers, which are reflective of the writer's personal writing habits. Handwriting is one of the behavioral characteristics, which is unique to a person, so handwriting varies from one person to another, and each person has his/her own writing habit. Generally, handwriting imitators can only imitate the glyphs, but they can not accurately reproduce the original author's writing habit, whereby there exist some differences in the details of the imitated handwriting and the original handwriting. Therefore, thanks to the difference and uniqueness of the handwriting, the identity of the writer may be identified by measuring the characteristics of the writer's glyph, and speed, order, and pressure of the strokes.

In particular, online handwriting recognition is able to obtain more biometric information in real time, such as, writing order, speed, pressure, angle, which may facilitate the identity recognition. However, special devices are needed to obtain those information, so the online handwriting recognition technique is limited to some specific applications and its prospect is also weakened. However, since offline handwriting is present is in the form of writing motion trajectories, that is, two-dimensional static images, the offline handwriting recognition needs to find out and extract characteristics information from the static images. The existing offline handwriting individual recognition technique mainly focuses on the extraction and analysis of the handwriting two-dimensional static features, or focuses on the extraction and analysis of single three-dimensional morphological features. However, it should be noted that the imitated handwriting may not be effectively recognized simply by using the two-dimensional static features, so there is a serious bottleneck problem in its applications. And it has limited capability to recognize the writer of the handwriting since the single three-dimensional morphological features reflect too little information.

SUMMARY OF THE INVENTION

Given that the foregoing problems exist in the prior art, the present invention provides an offline handwriting individual recognition system based on three-dimensional dynamic features, comprising:

a data acquisition module, configured to scan the obtained suspicious handwriting to obtain a first white light image and a first three-dimensional image corresponding to the suspicious handwriting, and configured to scan a plurality of obtained sample handwriting to obtain a plurality of second white light images and a plurality of second three-dimensional images corresponding to each of the plurality of sample handwriting;

a data pre-processing module, connected to the data acquisition module, configured to pre-processing the first white light image to obtain a first pre-processed image corresponding to the suspicious handwriting, and configured to pre-processing each of the plurality of second white light images to obtain second pre-processed images corresponding to each of the plurality of sample handwriting;

a skeleton extraction module, connected to the data pre-processing module, configured to extract the first pre-processed image to obtain a first skeleton image corresponding to the suspicious handwriting, and configured to extract each of the plurality of second pre-processed images to obtain second skeleton images corresponding to each of the plurality of sample handwriting;

wherein a line width of the first skeleton image and of each of the second skeleton images is a single pixel;

a stroke order recognition module, connected to the skeleton extraction module, configured to perform handwriting tracking according to the first skeleton image to obtain a first writing trajectory corresponding to the suspicious handwriting, and configured to perform handwriting tracking according to each of the second skeleton images to obtain second writing trajectories corresponding to each of the plurality of sample handwriting;

a first feature extraction module, connected to the data acquisition module and the stroke order recognition module, respectively, configured to extract feature from corresponding first white light image according to the first writing trajectory to obtain a first dynamic feature of each pixel in the first writing trajectory, and configured to extract feature from each corresponding second white light image according to the each of the second writing trajectories to obtain a second dynamic feature of each pixel in each of the second writing trajectories;

a second feature extraction module, connected to the data acquisition module and the stroke order recognition module, respectively, configured to extract a first three-dimensional feature of each pixel in the first writing trajectory from a corresponding first three-dimensional image according to the first writing trajectory, and configured to extract a second three-dimensional feature of each pixel in each of the second writing trajectories from each of the corresponding second three-dimensional images according to the each of the second writing trajectories;

a first data processing module, connected to the first feature extraction module and the second feature extraction module, respectively, configured to obtain a correlation coefficient between the suspicious handwriting and each of the plurality of sample handwriting, according to the first dynamic feature and the first three-dimensional feature corresponding to the suspicious handwriting, and the second dynamic feature and the second three-dimensional feature corresponding to the each of the plurality of sample handwriting; and a second data processing module, connected to the first data processing module, configured to process the suspicious handwriting, according to a first probability density distribution data and a second probability density distribution data obtained in advance by using statistics and each of the correlation coefficients, to obtain an individual recognition result of the suspicious handwriting.

Preferably, the first data processing module further comprises:

a feature vector generating unit, configured to add a first feature vector into the first dynamic feature and the first three-dimensional feature corresponding to the suspicious handwriting;

a feature matrix generating unit, configured to add the second dynamic feature and the second three-dimensional feature corresponding to the each of the plurality of sample handwriting to a second feature vector, the second feature vector comprising a plurality of second feature vectors arranged in rows and columns, each of the plurality of second feature vectors corresponding to the second dynamic feature and the second three-dimensional feature of the each of the plurality of sample handwriting;

a vector pair generating unit, connected to the feature vector generating unit and the feature matrix generating unit, respectively, and configured to combine the first feature vector and each of the plurality of second feature vectors in pairs to generate a plurality of vector pairs;

a dynamic time warping unit, connected to the vector pair generating unit, configured to perform dynamic time warping between the first feature vector and the second feature vector in each of the plurality of vector pairs, so that strokes corresponding to the first feature vector and corresponding parts thereof correspond to strokes corresponding to the second feature vector and corresponding parts thereof; and a data computing unit, connected to the dynamic time warping unit, and configured to calculate a correlation coefficient between the first feature vector and the second feature vector in each of the plurality of vector pairs having subjected to the dynamic time warping.

Preferably, the second data processing module further comprises:

a first data processing unit, configured to perform mean value processing on all of the correlation coefficients corresponding to the suspicious handwriting to obtain a mean value correlation coefficient corresponding to the suspicious handwriting;

a second data processing unit, connected to the first data processing unit, configured to calculate a first probability of the mean value correlation coefficient in the first probability density distribution data, and configured to calculate a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

a third data processing unit, connected to the second data processing unit, and configured to calculate a ratio of the first probability to the second probability to obtain a likelihood ratio of the suspicious handwriting; and a result judgment module, connected to the third data processing unit, and configured to perform matching in a preset likelihood ratio scale according to the likelihood ratio to obtain an individual recognition result of the suspicious handwriting.

Preferably, the first probability density distribution data refers to a probability density distribution of correlation coefficients between two real sample handwriting written by the same person, and the second probability density distribution data refers to a probability density distribution of correlation coefficients between a plurality of others' handwriting written by others based on his/her real sample handwriting and real sample handwriting.

Preferably, others' handwriting comprising allograph handwriting, and/or writing facsimile handwriting, and/or copying handwriting.

Preferably, the image pre-processing method comprises removing a background, and/or filling up blankness in strokes, and/or smoothing the strokes, and/or image binarization.

Preferably, the first dynamic feature comprises a width, and/or a gray scale, and/or a radian, and the first three-dimensional feature is a height.

Preferably, the second dynamic feature comprises a width, and/or a gray scale, and/or a radian, and the second three-dimensional feature is a height.

An offline handwriting individual recognition method based on three-dimensional dynamic features, applied to any one of the offline handwriting individual recognition system mentioned above, the method comprising:

Step S1, scanning, by the offline handwriting individual recognition system, the obtained suspicious handwriting to obtain a first white light image and a first three-dimensional image corresponding to the suspicious handwriting, and scanning a plurality of obtained sample handwriting respectively to obtain a plurality of second white light images and a plurality of second three-dimensional images corresponding to the plurality of sample handwriting;

Step S2, performing, by the offline handwriting individual recognition system, image pre-processing on the first white light image to obtain a first pre-processed image corresponding to the suspicious handwriting, and performing image pre-processing on each of the plurality of second white light images to obtain second pre-processed images corresponding to each of the plurality of sample handwriting;

Step S3, performing, by the offline handwriting individual recognition system, skeleton extraction on the first pre-processed image to obtain a first skeleton image corresponding to the suspicious handwriting, and performing skeleton extraction on each of the plurality of second pre-processed images to obtain second skeleton images corresponding to each of the plurality of sample handwriting;

Step S4, performing, by the offline handwriting individual recognition system, handwriting tracking according to the first skeleton image to obtain a first writing trajectory corresponding to the suspicious handwriting, and performing handwriting tracking according to each of the second skeleton images to obtain second writing trajectories corresponding to each of the plurality of sample handwriting;

Step S5, performing, by the offline handwriting individual recognition system, feature extraction on corresponding first white light image according to the first writing trajectory to obtain a first dynamic feature of each pixel in the first writing trajectory, and performing feature extraction on each corresponding second white light image according to the each of the second writing trajectories to obtain a second dynamic feature of each pixel in each of the second writing trajectories;

Step S6, extracting, by the offline handwriting individual recognition system, a first three-dimensional feature of each pixel in the first writing trajectory from a corresponding first three-dimensional image according to the first writing trajectory, and extracting a second three-dimensional feature of each pixel of the second writing trajectories from each of the corresponding second three-dimensional images according to the each of the second writing trajectories;

Step S7, processing, by the offline handwriting individual recognition system, to obtain a correlation coefficient between the suspicious handwriting and each of the plurality of sample handwriting, according to the first dynamic feature and the first three-dimensional feature corresponding to the suspicious handwriting, and the second dynamic feature and the second three-dimensional feature of the each of the plurality of sample handwriting; and Step S8, processing, by the offline handwriting individual recognition system, the suspicious handwriting, according to a first probability density distribution data and a second probability density distribution data obtained in advance by using statistics and each of the correlation coefficients, to obtain an individual recognition result of the suspicious handwriting.

Preferably, Step S7 further comprises:

Step S71, adding, by the offline handwriting individual recognition system, the first dynamic feature and the first three-dimensional feature corresponding to the suspicious handwriting to a first feature vector;

Step S72, adding, by the offline handwriting individual recognition system, the second dynamic feature and the second three-dimensional feature corresponding to the each of the plurality of sample handwriting to a second feature vector, the second feature vector comprising a plurality of second feature vectors arranged in rows and columns, each of the plurality of second feature vectors corresponding to the second dynamic feature and the second three-dimensional feature corresponding to the each of the plurality of sample handwriting;

Step S73, combining, by the offline handwriting individual recognition system, the first feature vector and each of the plurality of second feature vectors in pairs to generate a plurality of vector pairs;

Step S74, performing, by the offline handwriting individual recognition system, dynamic time warping between the first feature vector and the second feature vector in each of the plurality of vector pairs, so that strokes corresponding to the first feature vector and corresponding parts thereof correspond to strokes corresponding to the second feature vector and corresponding parts thereof; and Step S75, calculating, by the offline handwriting individual recognition system, a correlation coefficient between the first feature vector and the second feature vector in each of the plurality of vector pairs having subjected to the dynamic time warping.

Preferably, in Step S74, dynamic time wrapping between the first feature vector and the second feature vector in each of the plurality of vector pairs by using DTW technique is performed, so that strokes corresponding to the first feature vector and corresponding parts thereof correspond to strokes corresponding to the second feature vector and corresponding parts thereof.

Preferably, Step S8 further comprises:

Step S81, performing a mean value processing, by the offline handwriting individual recognition system, on all of the correlation coefficients corresponding to the suspicious handwriting to obtain a mean value correlation coefficient corresponding to the suspicious handwriting;

Step S82, calculating, by the offline handwriting individual recognition system, a first probability of the mean value correlation coefficient in the first probability density distribution data, and calculating a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

Step S83, calculating, by the offline handwriting individual recognition system, a ratio of the first probability to the second probability to obtain a likelihood ratio of the suspicious handwriting; and Step S84, performing, by the offline handwriting individual recognition system, matching in a preset likelihood ratio scale according to the likelihood ratio to obtain an individual recognition result of the suspicious handwriting.

By adopting the above-mentioned technical solutions, the present invention has the following beneficial effects.

1. When compared with conventional two-dimensional image features and single three-dimensional morphological features, it contains larger amounts of information, and much more features are available there.
2. The image pre-processing technology effectively removes the interference from factors, such as paper background, adapts to the writing result of writing tools having different thicknesses, and improves compatibility with different objects to be detected.
3. The automatic extraction of features excludes the participation of human subjective factors to the greatest extent, avoids the interference of human factors from the source, and effectively improves the accuracy of recognition.
4. The correlation coefficient between the suspicious handwriting and the sample handwriting is further processed by the probability density distribution obtained in advance by using statistics, which further improves the recognition accuracy.

BRIEF DESCRIPTION OF THE DRAWINGS

FIG. 2 is a schematic diagram of a likelihood ratio scale in a preferred embodiment of the present invention;

DETAILED DESCRIPTION

Figure 1:
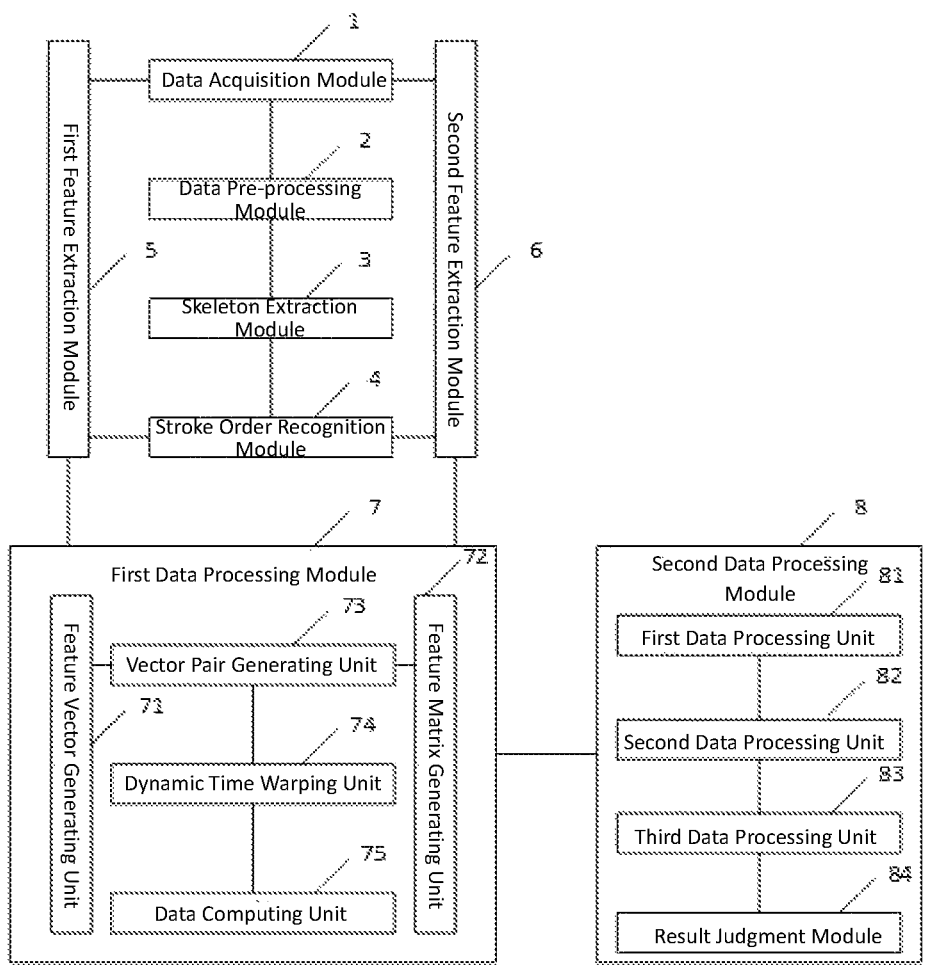
FIG. 1 is a schematic diagram of an offline handwriting individual recognition system based on three-dimensional dynamic features in a preferred embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In a preferred embodiment of the present invention, given that the foregoing problems exist in the prior art, the present invention provides an offline handwriting individual recognition system based on three-dimensional dynamic features, as shown in FIG. 1, the system comprising:

- a data acquisition module 1, configured to scan the obtained suspicious handwriting to obtain a first white light image and a first three-dimensional image corresponding to the suspicious handwriting, and configured to scan a plurality of obtained sample handwriting to obtain a plurality of second white light images and a plurality of second three-dimensional images corresponding to each of the plurality of sample handwriting;

- a data pre-processing module 2, connected to the data acquisition module 1, configured to pre-processing the first white light image to obtain a first pre-processed image corresponding to the suspicious handwriting, and configured to pre-processing each of the plurality of second white light images to obtain second pre-processed images corresponding to each of the plurality of sample handwriting;

- a skeleton extraction module 3, connected to the data pre-processing module, configured to extract the first pre-processed image to obtain a first skeleton image corresponding to the suspicious handwriting, and configured to exact each of the plurality of second pre-processed images to obtain second skeleton images corresponding to each of the plurality of sample handwriting;

wherein a line width of the first skeleton image and of each of the second skeleton images is a single pixel;

- a stroke order recognition module 4, connected to the skeleton extraction module 3, configured to perform handwriting tracking according to the first skeleton image to obtain a first writing trajectory corresponding to the suspicious handwriting, and configured to perform handwriting tracking according to each of the second skeleton images to obtain second writing trajectories corresponding to each of the plurality of sample handwriting;

- a first feature extraction module 5, connected to the data acquisition module 1 and the stroke order recognition module 4, respectively, configured to extract feature from each corresponding first white light image according to the first writing trajectory to obtain a first dynamic feature of each pixel in the first writing trajectory, and configured to extract feature from each corresponding second white light image according to the each of the second writing trajectories to obtain a second dynamic feature of each pixel in each of the second writing trajectories;

- a second feature extraction module 6, connected to the data acquisition module 1 and the stroke order recognition module 4, respectively, configured to extract a first three-dimensional feature of each pixel in the first writing trajectory from a corresponding first three-dimensional image according to the first writing trajectory, and configured to extract a second three-dimensional feature of each pixel in each of the second writing trajectories from each of the corresponding second three-dimensional images according to the each of the second writing trajectories;

- a first data processing module 7, connected to the first feature extraction module 5 and the second feature extraction module 6, respectively, configured to obtain a correlation coefficient between the suspicious handwriting and each of the plurality of sample handwriting, according to the first dynamic feature and the first three-dimensional feature corresponding to the suspicious handwriting, and the second dynamic feature and the second three-dimensional feature corresponding to the each of the plurality of sample handwriting; and

- a second data processing module 8, connected to the first data processing module 7, configured to process the suspicious handwriting, according to a first probability density distribution data and a second probability density distribution data obtained in advance by using statistics and each of the correlation coefficients, to obtain an individual recognition result of the suspicious handwriting.

Preferably, First of all, the large-area optical three-dimensional topography scanning instrument is used for scanning operation. Specifically, each suspicious handwriting and sample handwriting to be detected are sequentially placed on a objective table of the large-area optical three-dimensional topography scanning instrument; it is determined whether to turn on a vacuum absorption device according to the conditions of the paper; after scanning operation is completed, a computer connected to the large-area optical three-dimensional topography scanning instrument acquires a first white light image and a first three-dimensional image corresponding to the suspicious handwriting, and acquires a second white light image and a second three-dimensional image corresponding to each of the plurality of sample handwriting. Then performing image pre-processing on the first white light image and the second white light image respectively to obtain a first pre-processed image corresponding to the first white light image and a second pre-processed image corresponding to the second white light image. The image pre-processing method comprises removing a background, filling up blankness in strokes, smoothing the strokes, image binarization, and so on.

In this embodiment, the suspicious handwriting and the sample handwriting are processed in a similar way, so by way of example, the processing steps for the suspicious handwriting is illustrated herein, and the processing steps for the sample handwriting will not be repeated herein. The processing steps for the suspicious handwriting is as follows:

extracting a skeleton corresponding to the suspicious handwriting form the first pre-processed image to obtain a first skeleton image corresponding to the suspicious handwriting, and obtaining a first writing trajectory corresponding to the suspicious handwriting by performing handwriting tracking on the first skeleton image. The handwriting tracking process is performed in the form of human-machine interaction, and the process further comprises:

first of all, the mouse, the electronic pen, or the touch screen is used to click a position adjacent to the starting position of the stroke on the first skeleton image to automatically obtain the starting point of the stroke, and then to track along a direction of the stroke; if the stroke currently being tracked is wrong or misoperation occurs due to human factors, the currently tracked stroke may be cancelled, so as to return to the previous stroke and continue to track the strokes until track down to each stroke of the first skeleton image; finally, the first writing trajectory is obtained.

Furthermore, first dynamic features of each pixel in the first writing trajectory are obtained on the first white light image according to the obtained first writing trajectory, wherein, the first dynamic features comprise stroke width, stroke gray scale, and stroke radian. Furthermore, a first three-dimensional feature (that is, height data of the each pixel) of each pixel in the first writing trajectory is obtained on the corresponding first three-dimensional image. The first dynamic features and the first three-dimensional features construct the three-dimensional dynamic features of the suspicious handwriting.

In this embodiment, the three-dimensional dynamic features of the sample handwriting are obtained by processing the sample handwriting according to the same processing process as described above. Then the correlation coefficient between the three-dimensional dynamic features of the suspicious handwriting and the three-dimensional dynamic features of the sample handwriting is calculated, and the similarity between the suspicious handwriting and the sample handwriting is characterized by the correlation coefficient. Specifically, the handwriting is formed by a continuous process, that is, even if the handwriting is written by the same person, each of the corresponding strokes has a different length and the writing speed for each stoke is not exactly the same, therefore, sequence length corresponding to the handwriting is different, and the same stroke may be displaced in the same sequence. Thus, on a coordinate system with the sequence length as the horizontal axis, the sequence length of each stroke in the case where the three-dimensional dynamic features of the suspicious handwriting projects on the coordinate system is not exactly the same as the sequence length of each stroke in the case where the three-dimensional dynamic features of the sample handwriting projects on the coordinate system, so it is impossible to calculate the correlation coefficient between the three-dimensional dynamic features of the suspicious handwriting and the three-dimensional dynamic features of the sample handwriting. Therefore, it is required to perform dynamic time warping on a set of the three-dimensional dynamic features of the suspicious handwriting and the three-dimensional dynamic features of the sample handwriting which need to be calculated for the correlation coefficient in prior to calculating the correlation coefficient. In this embodiment, the dynamic time warping is processed by using DTW technique, so that the three-dimensional dynamic features of the suspicious handwriting and the three-dimensional dynamic features of the sample handwriting have a one-one correspondence for the same stroke, and the same stroke is the same in terms of the sequence length.

In this embodiment, after the similarity between the suspicious handwriting and the sample handwriting is obtained, the above-mentioned similarity, that is, the correlation coefficient, needs to be substituted into the probability density distribution obtained in advance by using statistics for further processing for the purpose of improving the recognition accuracy. During the process of handwriting recognition, when only one suspicious handwriting and one sample handwriting are obtained, the comparison result has only one correlation coefficient, and the correlation coefficient is the mean value correlation coefficient according to the present invention. It should be noted that a plurality of suspicious handwriting and a plurality of sample handwriting are obtained when the handwriting recognition is performed, for example, two suspicious handwriting and three sample handwriting. The correlation coefficients are respectively calculated by the three-dimensional dynamic features of the two suspicious handwriting and the three-dimensional dynamic features of the three sample handwriting, then calculation results corresponding to the three correlation coefficients are obtained for each suspicious handwriting.

In this embodiment, for each suspicious handwriting, it is not necessary to substitute all of the three correlation coefficients into the probability density distribution obtained in advance by using statistics for further processing. Instead, first of all, performing mean value processing on all of the three correlation coefficients to obtain a corresponding mean value correlation coefficient, than substituting the corresponding mean value correlation coefficient into the probability density distribution obtained in advance by using statistics for further processing.

In particular, the first probability density distribution data obtained in advance by using statistics refers to a probability density distribution of correlation coefficients between two real sample handwriting in a plurality of real sample handwriting written by the same person, and the second probability density distribution data refers to a probability density distribution of correlation coefficients between each of a plurality of others' handwriting written by others based on his/her real sample handwriting and his/her real sample handwriting. In this embodiment, hundreds of thousands of handwriting data are acquired in advance, and a corresponding handwriting database is established according to the handwriting data. The handwriting database comprises a plurality of real sample handwriting written by the same person, that is, the handwriting of the writer. The handwriting database further comprises a plurality of others' handwriting obtained by imitating the real sample handwriting, that is, allograph handwriting, and/or writing facsimile handwriting, and/or copying handwriting obtained by imitating the real handwriting. The correlation coefficients between two real handwriting are calculated separately, and the probability density distribution of the real handwriting is obtained according to the obtained correlation coefficients. The correlation coefficients between each of the others' handwriting and the real handwriting are calculated separately, and the probability density distribution of the others' handwriting is obtained according to the obtained correlation coefficients. Then, the mean value correlation coefficient of each suspicious handwriting obtained above is substituted into the probability density distribution of the real handwriting and the probability density distribution of others' handwriting to obtain the first probability that the suspicious handwriting and the sample handwriting are written by the same person, and to obtain the second probability that the suspicious handwriting and the sample handwriting are not written by the same person.

In this embodiment, the likelihood ratio of the suspicious handwriting is further calculated by the following formula:

$$SLR = \frac{\hat{g}[s(E_U, E_S) \mid H_p]}{\hat{g}[s(E_U, E_S) \mid H_d]}$$

wherein SLR represents the likelihood ratio of the suspicious handwriting, $H_p$ represents that the suspicious handwriting and the sample handwriting is written by the same person; $H_d$ represents that the suspicious handwriting and the sample handwriting is not written by the same person, $E_U$ represents the suspicious handwriting, and $E_S$ represents the sample handwriting.

In this embodiment, as shown in FIG. 2, a preset likelihood ratio scale is provided. The calculation result of the likelihood ratio is matched with the likelihood ratio scale, if the likelihood ratio is greater than 10,000, it indicated that an individual recognition result that there is a high probability that the suspicious handwriting and the sample handwriting is written by the same person; if the likelihood ratio is less than 0.001, it indicated that an individual recognition result that there is a high probability that the suspicious handwriting and the sample handwriting is not written by the same person, and so on.

In a preferred embodiment of the present invention, the first data processing module 7 further comprises:

a feature vector generating unit 71, configured to add a first feature vector into the first dynamic feature and the first three-dimensional feature corresponding to the suspicious handwriting;

a feature matrix generating unit 72, configured to add the second dynamic feature and the second three-dimensional feature corresponding to the each of the plurality of sample handwriting to a second feature vector, the second feature vector comprising a plurality of second feature vectors arranged in rows and columns, each of the plurality of second feature vectors corresponding to the second dynamic feature and the second three-dimensional feature of the each of the plurality of sample handwriting;

a vector pair generating unit 73, connected to the feature vector generating unit 71 and the feature matrix generating unit 72, respectively, and configured to combine the first feature vector and each of the plurality of second feature vectors in pairs to generate a plurality of vector pairs;

a dynamic time warping unit 74, connected to the vector pair generating unit 73, configured to perform dynamic time warping between the first feature vector and the second feature vector in each of the plurality of vector pairs, so that strokes corresponding to the first feature vector and corresponding parts thereof correspond to strokes corresponding to the second feature vector and corresponding parts thereof; and a data computing unit 75, connected to the dynamic time warping unit 74, and configured to calculate a correlation coefficient between the first feature vector and the second feature vector in each of the plurality of vector pairs having subjected to the dynamic time warping.

In a preferred embodiment of the present invention, the dynamic time warping unit 74 performs dynamic time wrapping between the first feature vector and the second feature vector in each of the plurality of vector pairs by using DTW technique, so that strokes corresponding to the first feature vector and corresponding parts thereof correspond to strokes corresponding to the second feature vector and corresponding parts thereof.

In a preferred embodiment of the present invention, the second data processing module 8 further comprises:

a first data processing unit 81, configured to perform mean value processing on all of the correlation coefficients corresponding to the suspicious handwriting to obtain a mean value correlation coefficient corresponding to the suspicious handwriting;

a second data processing unit 82, connected to the first data processing unit 81, configured to calculate a first probability of the mean value correlation coefficient in the first probability density distribution data, and configured to calculate a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

a third data processing unit 83, connected to the second data processing unit 82, and configured to calculate a ratio of the first probability to the second probability to obtain a likelihood ratio of the suspicious handwriting; and a result judgment module 84, connected to the third data processing unit 83, and configured to perform matching in a preset likelihood ratio scale according to the likelihood ratio to obtain an individual recognition result of the suspicious handwriting.

In a preferred embodiment of the present invention, the first probability density distribution data refers to a probability density distribution of correlation coefficients between two real sample handwriting written by the same person, and the second probability density distribution data refers to a probability density distribution of correlation coefficients between a plurality of others' handwriting written by others based on his/her real sample handwriting and real sample handwriting.

In a preferred embodiment of the present invention, others' handwriting comprising allograph handwriting, and/or writing facsimile handwriting, and/or copying handwriting.

In a preferred embodiment of the present invention, the image pre-processing method comprises removing a background, and/or filling up blankness in strokes, and/or smoothing the strokes, and/or image binarization.

In a preferred embodiment of the present invention, the first dynamic feature comprises a width, and/or a gray scale, and/or a radian, and the first three-dimensional feature is a height.

In a preferred embodiment of the present invention, the second dynamic feature comprises a width, and/or a gray scale, and/or a radian, and the second three-dimensional feature is a height.

Figure 3:
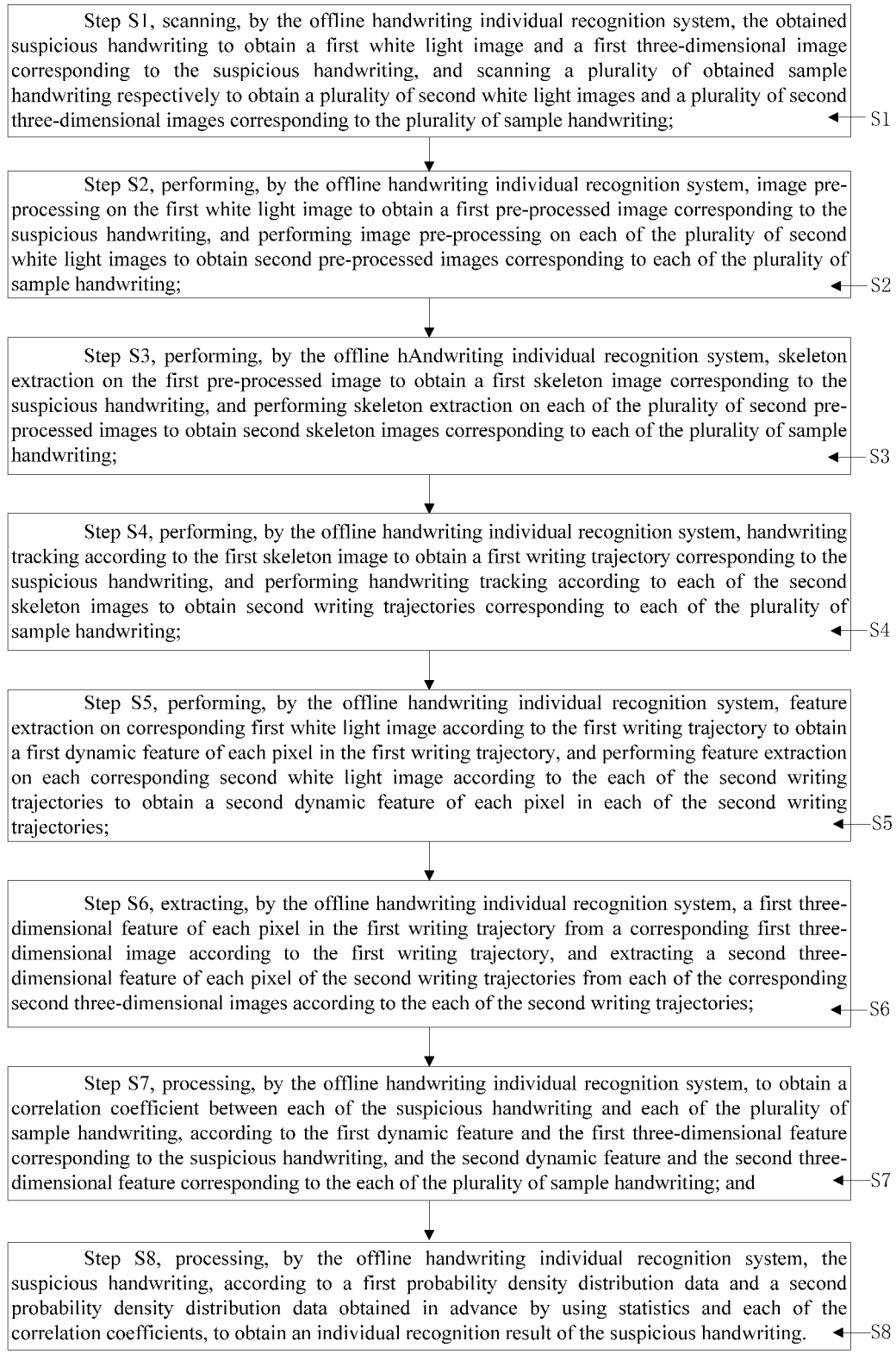
FIG. 3 is a flowchart of an offline handwriting individual recognition method based on three-dimensional dynamic features in a preferred embodiment of the present invention.

An offline handwriting individual recognition method based on three-dimensional dynamic features, applied to any one of the offline handwriting individual recognition system mentioned above, as shown in FIG. 3, the method comprising:

Step S1, scanning, by the offline handwriting individual recognition system, the obtained suspicious handwriting to obtain a first white light image and a first three-dimensional image corresponding to the suspicious handwriting, and scanning a plurality of obtained sample handwriting respectively to obtain a plurality of second white light images and a plurality of second three-dimensional images corresponding to the plurality of sample handwriting;

Step S2, performing, by the offline handwriting individual recognition system, image pre-processing on the first white light image to obtain a first pre-processed image corresponding to the suspicious handwriting, and performing image pre-processing on each of the plurality of second white light images to obtain second pre-processed images corresponding to each of the plurality of sample handwriting;

Step S3, performing, by the offline handwriting individual recognition system, skeleton extraction on the first pre-processed image to obtain a first skeleton image corresponding to the suspicious handwriting, and performing skeleton extraction on each of the plurality of second pre-processed images to obtain second skeleton images corresponding to each of the plurality of sample handwriting;

Step S4, performing, by the offline handwriting individual recognition system, handwriting tracking according to the first skeleton image to obtain a first writing trajectory corresponding to the suspicious handwriting, and performing handwriting tracking according to each of the second skeleton images to obtain second writing trajectories corresponding to each of the plurality of sample handwriting;

Step S5, performing, by the offline handwriting individual recognition system, feature extraction on each corresponding first white light image according to the first writing trajectory to obtain a first dynamic feature of each pixel in the first writing trajectory, and performing feature extraction on corresponding second white light image according to the each of the second writing trajectories to obtain a second dynamic feature of each pixel in each of the second writing trajectories;

Step S6, extracting, by the offline handwriting individual recognition system, a first three-dimensional feature of each pixel in the first writing trajectory from a corresponding first three-dimensional image according to the first writing trajectory, and extracting a second three-dimensional feature of each pixel of the second writing trajectories from each of the corresponding second three-dimensional images according to the each of the second writing trajectories;

Step S7, processing, by the offline handwriting individual recognition system, to obtain a correlation coefficient between each of the suspicious handwriting and each of the plurality of sample handwriting, according to the first dynamic feature and the first three-dimensional feature corresponding to the suspicious handwriting, and the second dynamic feature and the second three-dimensional feature corresponding to the each of the plurality of sample handwriting; and Step S8, processing, by the offline handwriting individual recognition system, the suspicious handwriting, according to a first probability density distribution data and a second probability density distribution data obtained in advance by using statistics and each of the correlation coefficients, to obtain an individual recognition result of the suspicious handwriting.

Figure 4:
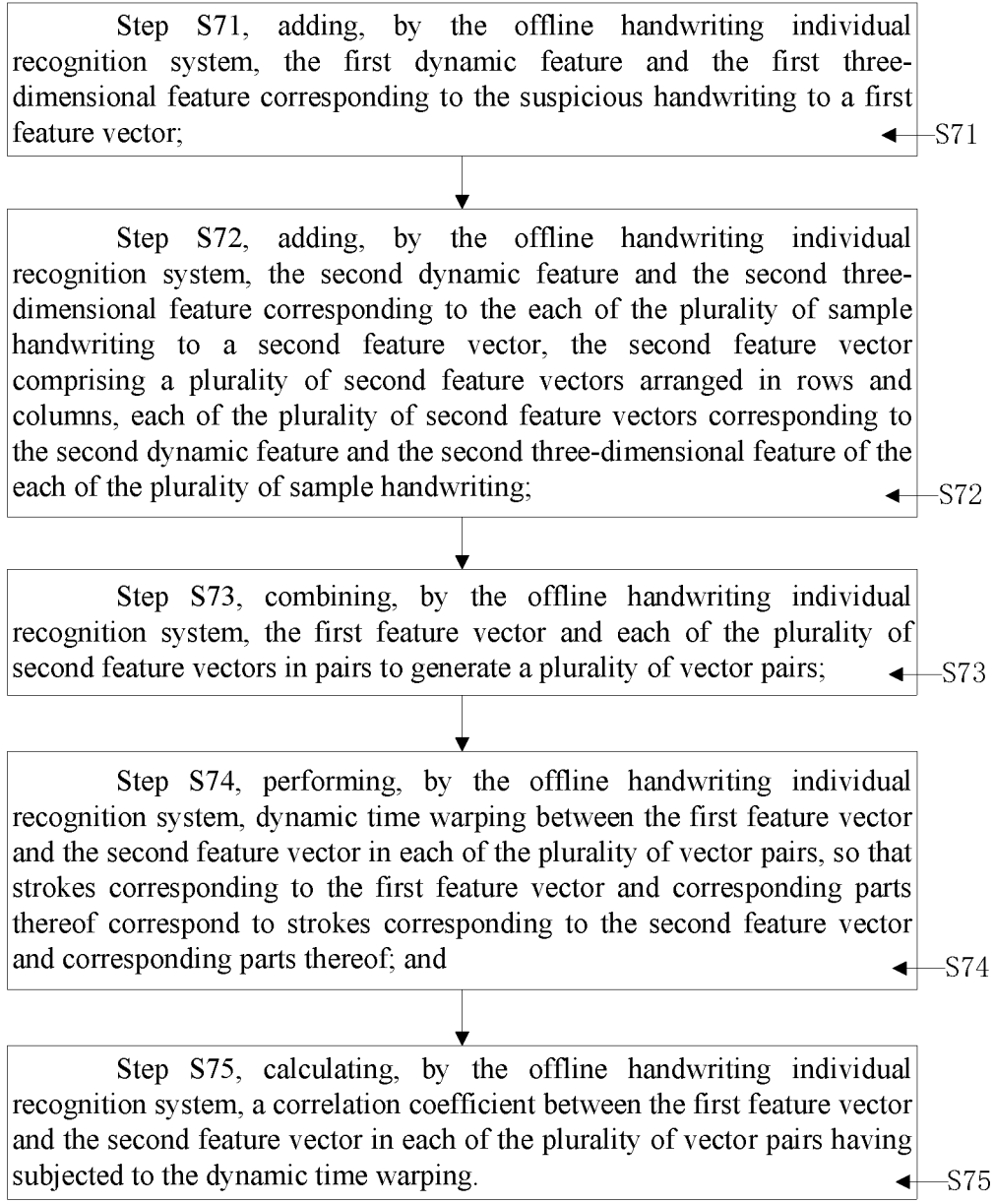
FIG. 4 is a sub-flowchart of an offline handwriting individual recognition method based on three-dimensional dynamic features in a preferred embodiment of the present invention.

In a preferred embodiment of the present invention, as shown in FIG. 4, Step S7 further comprises:

Step S71, adding, by the offline handwriting individual recognition system, the first dynamic feature and the first three-dimensional feature corresponding to the suspicious handwriting to a first feature vector;

Step S72, adding, by the offline handwriting individual recognition system, the second dynamic feature and the second three-dimensional feature corresponding to the each of the plurality of sample handwriting to a second feature vector, the second feature vector comprising a plurality of second feature vectors arranged in rows and columns, each of the plurality of second feature vectors corresponding to the second dynamic feature and the second three-dimensional feature of the each of the plurality of sample handwriting;

Step S73, combining, by the offline handwriting individual recognition system, the first feature vector and each of the plurality of second feature vectors in pairs to generate a plurality of vector pairs;

Step S74, performing, by the offline handwriting individual recognition system, dynamic time warping between the first feature vector and the second feature vector in each of the plurality of vector pairs, so that strokes corresponding to the first feature vector and corresponding parts thereof correspond to strokes corresponding to the second feature vector and corresponding parts thereof; and Step S75, calculating, by the offline handwriting individual recognition system, a correlation coefficient between the first feature vector and the second feature vector in each of the plurality of vector pairs having subjected to the dynamic time warping.

In a preferred embodiment of the present invention, in Step S74, dynamic time wrapping between the first feature vector and the second feature vector in each of the plurality of vector pairs by using DTW technique is performed, so that strokes corresponding to the first feature vector and corresponding parts thereof correspond to strokes corresponding to the second feature vector and corresponding parts thereof.

Figure 5:
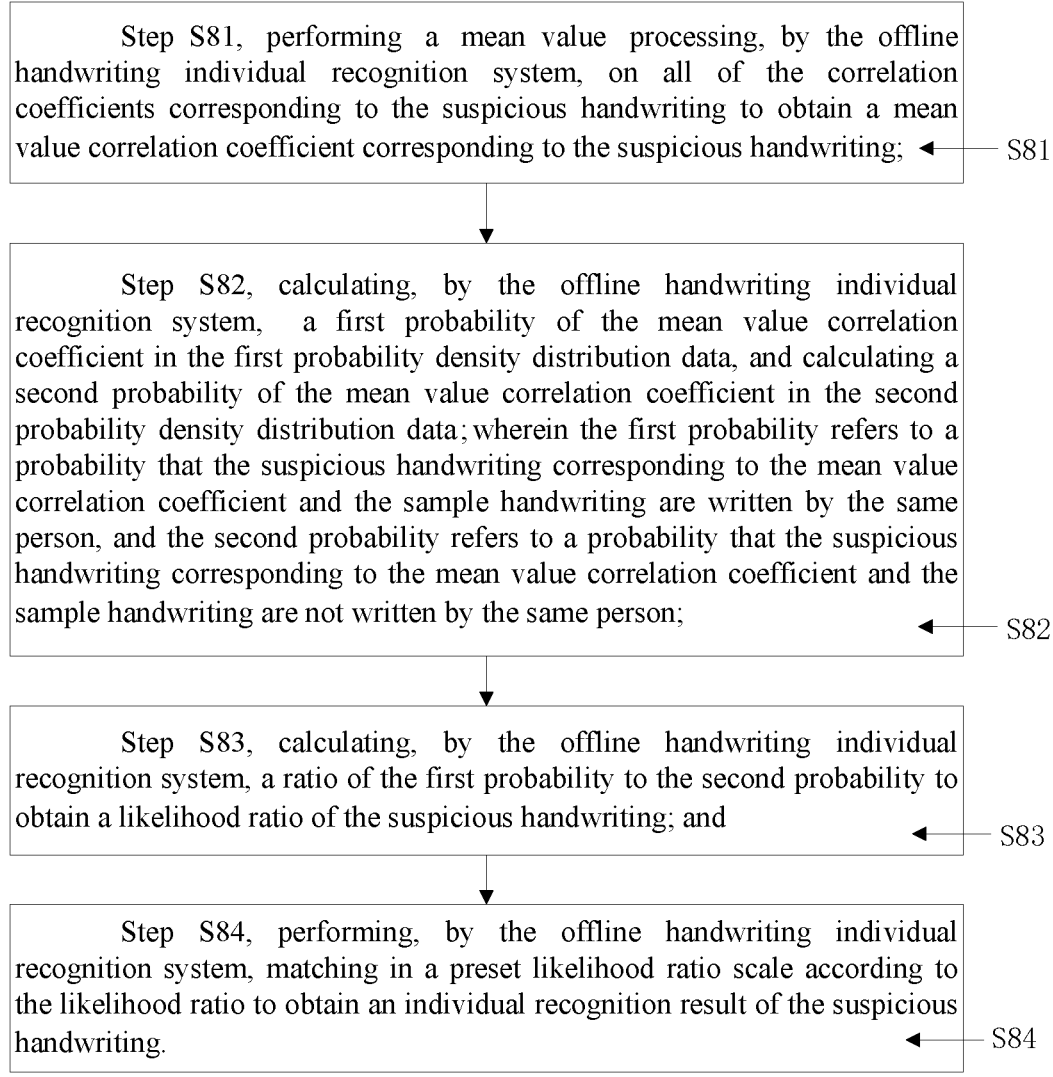
FIG. 5 is a sub-flowchart of an offline handwriting individual recognition method based on three-dimensional dynamic features in a preferred embodiment of the present invention.

In a preferred embodiment of the present invention, as shown in FIG. 5, Step S8 further comprises:

Step S81, performing a mean value processing, by the offline handwriting individual recognition system, on all of the correlation coefficients corresponding to the suspicious handwriting to obtain a mean value correlation coefficient corresponding to the suspicious handwriting;

Step S82, calculating, by the offline handwriting individual recognition system, a first probability of the mean value correlation coefficient in the first probability density distribution data, and calculating a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

Step S83, calculating, by the offline handwriting individual recognition system, a ratio of the first probability to the second probability to obtain a likelihood ratio of the suspicious handwriting; and Step S84, performing, by the offline handwriting individual recognition system, matching in a preset likelihood ratio scale according to the likelihood ratio to obtain an individual recognition result of the suspicious handwriting.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. An offline handwriting individual recognition system based on three-dimensional dynamic features, comprising:

a data acquisition module, configured to scan obtained suspicious handwriting to obtain a first white light image and a first three-dimensional image corresponding to the suspicious handwriting, and configured to scan a plurality of obtained sample handwritings to obtain a plurality of second white light images and a plurality of second three-dimensional images corresponding to each of the plurality of sample handwritings;

a data pre-processing module, connected to the data acquisition module, configured to pre-process the first white light image to obtain a first pre-processed image corresponding to the suspicious handwriting, and configured to pre-process each of the plurality of second white light images to obtain second pre-processed images corresponding to each of the plurality of sample handwritings;

a skeleton extraction module, connected to the data pre-processing module, configured to extract the first pre-processed image to obtain a first skeleton image corresponding to the suspicious handwriting, and configured to extract each of the plurality of second pre-processed images to obtain second skeleton images corresponding to each of the plurality of sample handwritings;

wherein a line width of the first skeleton image and of each of the second skeleton images is a single pixel;

a stroke order recognition module, connected to the skeleton extraction module, configured to perform handwriting tracking according to the first skeleton image to obtain a first writing trajectory corresponding to the suspicious handwriting, and configured to perform handwriting tracking according to each of the second skeleton images to obtain second writing trajectories corresponding to each of the plurality of sample handwritings;

a first feature extraction module, connected to the data acquisition module and the stroke order recognition module, respectively, configured to extract features from corresponding first white light image according to the first writing trajectory to obtain a first dynamic feature of each pixel in the first writing trajectory, and configured to extract features from each corresponding second white light image according to the each of the second writing trajectories to obtain a second dynamic feature of each pixel in each of the second writing trajectories;

a second feature extraction module, connected to the data acquisition module and the stroke order recognition module, respectively, configured to extract a first three-dimensional feature of each pixel in the first writing trajectory from a corresponding first three-dimensional image according to the first writing trajectory, and configured to extract a second three-dimensional feature of each pixel in each of the second writing trajectories from each of the corresponding second three-dimensional images according to the each of the second writing trajectories;

a first data processing module, connected to the first feature extraction module and the second feature extraction module, respectively, configured to obtain a correlation coefficient between the suspicious handwriting and each of the plurality of sample handwritings, according to the first dynamic feature and the first three-dimensional feature corresponding to the suspicious handwriting, and the second dynamic feature and the second three-dimensional feature corresponding to the each of the plurality of sample handwritings; and a second data processing module, connected to the first data processing module, configured to process the suspicious handwriting, according to a first probability density distribution data and a second probability density distribution data obtained in advance by using statistics and each of the correlation coefficients, to obtain an individual recognition result of the suspicious handwriting.

2. The offline handwriting individual recognition system of claim 1, wherein the first data processing module further comprises:

a feature vector generating unit, configured to add a first feature vector into the first dynamic feature and the first three-dimensional feature corresponding to the suspicious handwriting;

a feature matrix generating unit, configured to add the second dynamic feature and the second three-dimensional feature corresponding to the each of the plurality of sample handwritings to a second feature vector, the second feature vector comprising a plurality of second feature vectors arranged in rows and columns, each of the plurality of second feature vectors corresponding to the second dynamic feature and the second three-dimensional feature of the each of the plurality of sample handwritings;

a vector pair generating unit, connected to the feature vector generating unit and the feature matrix generating unit, respectively, and configured to combine the first feature vector and each of the plurality of second feature vectors in pairs to generate a plurality of vector pairs;

a dynamic time warping unit, connected to the vector pair generating unit, configured to perform dynamic time warping between the first feature vector and the second feature vector in each of the plurality of vector pairs, so that strokes corresponding to the first feature vector and corresponding parts thereof correspond to strokes corresponding to the second feature vector and corresponding parts thereof; and a data computing unit, connected to the dynamic time warping unit, and configured to calculate a correlation coefficient between the first feature vector and the second feature vector in each of the plurality of vector pairs having been subjected to the dynamic time warping.

3. The offline handwriting individual recognition system of claim 2, wherein the dynamic time warping unit performs dynamic time wrapping between the first feature vector and the second feature vector in each of the plurality of vector pairs by using dynamic time warping technique, so that strokes corresponding to the first feature vector and corresponding parts thereof correspond to strokes corresponding to the second feature vector and corresponding parts thereof.

4. The offline handwriting individual recognition system of claim 1, wherein the second data processing module further comprises:
- a first data processing unit, configured to perform mean value processing on all of the correlation coefficients corresponding to the suspicious handwriting to obtain a mean value correlation coefficient corresponding to the suspicious handwriting;
- a second data processing unit, connected to the first data processing unit, configured to calculate a first probability of the mean value correlation coefficient in the first probability density distribution data, and configured to calculate a second probability of the mean value correlation coefficient in the second probability density distribution data;
- wherein the first probability refers to a probability that the suspicious handwriting corresponding to the mean value correlation coefficient and the sample handwritings are written by the same person, and the second probability refers to a probability that the suspicious handwriting corresponding to the mean value correlation coefficient and the sample handwritings are not written by the same person;
- a third data processing unit, connected to the second data processing unit, and configured to calculate a ratio of the first probability to the second probability to obtain a likelihood ratio of the suspicious handwriting, the likelihood ratio of the suspicious handwriting is further calculated by the following formula:

$$SLR = \frac{\hat{g}[s(E_U, E_S) \mid H_p]}{\hat{g}[s(E_U, E_S) \mid H_d]}$$

wherein SLR represents the likelihood ratio of the suspicious handwriting, $H_p$ represents that the suspicious handwriting and the sample handwriting is written by the same person; $H_d$ represents that the suspicious handwriting and the sample handwriting is not written by the same person, $E_U$ represents the suspicious handwriting, and $E_S$ represents the sample handwriting; and
- a result judgment module, connected to the third data processing unit, and configured to perform matching in a preset likelihood ratio scale according to the likelihood ratio to obtain an individual recognition result of the suspicious handwriting.

5. The offline handwriting individual recognition system of claim 4, wherein the first probability density distribution data refers to a probability density distribution of correlation coefficients between two real sample handwritings written by the same person, and
the second probability density distribution data refers to a probability density distribution of correlation coefficients between a plurality of others' handwriting written by others based on his/her real sample handwritings and real sample handwritings.

6. The offline handwriting individual recognition system of claim 5, wherein others' handwriting comprising allograph handwriting, and/or writing facsimile handwriting, and/or copying handwriting.

7. The offline handwriting individual recognition system of claim 1, wherein the image pre-processing method comprises removing a background, and/or filling up blankness in strokes, and/or smoothing the strokes, and/or image binarization.

8. The offline handwriting individual recognition system of claim 1, wherein the first dynamic feature comprises a width, and/or a gray scale, and/or a radian, and the first three-dimensional feature is a height.

9. The offline handwriting individual recognition system of claim 1, wherein the second dynamic feature comprises a width, and/or a gray scale, and/or a radian, and the second three-dimensional feature is a height.

10. An offline handwriting individual recognition method based on three-dimensional dynamic features, applied to the offline handwriting individual recognition system of claim 1, the method comprising the steps of:
scanning, by the offline handwriting individual recognition system, the obtained suspicious handwriting to obtain a first white light image and a first three-dimensional image corresponding to the suspicious handwriting, and scanning a plurality of obtained sample handwritings respectively to obtain a plurality of second white light images and a plurality of second three-dimensional images corresponding to the plurality of sample handwritings;
performing, by the offline handwriting individual recognition system, image pre-processing on the first white light image to obtain a first pre-processed image corresponding to the suspicious handwriting, and performing image pre-processing on each of the plurality of second white light images to obtain second pre-processed images corresponding to each of the plurality of sample handwritings;
performing, by the offline handwriting individual recognition system, skeleton extraction on the first pre-processed image to obtain a first skeleton image corresponding to the suspicious handwriting, and performing skeleton extraction on each of the plurality of second pre-processed images to obtain second skeleton images corresponding to each of the plurality of sample handwritings;
performing, by the offline handwriting individual recognition system, handwriting tracking according to the first skeleton image to obtain a first writing trajectory corresponding to the suspicious handwriting, and performing handwriting tracking according to each of the second skeleton images to obtain second writing trajectories corresponding to each of the plurality of sample handwritings;
performing, by the offline handwriting individual recognition system, feature extraction on corresponding first white light image according to the first writing trajectory to obtain a first dynamic feature of each pixel in the first writing trajectory, and performing feature extraction on each corresponding second white light image according to the each of the second writing trajectories to obtain a second dynamic feature of each pixel in each of the second writing trajectories;
extracting, by the offline handwriting individual recognition system, a first three-dimensional feature of each pixel in the first writing trajectory from a corresponding first three-dimensional image according to the first writing trajectory, and extracting a second three-dimensional feature of each pixel of the second writing trajectories from each of the corresponding second three-dimensional images according to the each of the second writing trajectories;

processing, by the offline handwriting individual recognition system, to obtain a correlation coefficient between the suspicious handwriting and each of the plurality of sample handwritings, according to the first dynamic feature and the first three-dimensional feature corresponding to the suspicious handwriting, and the second dynamic feature and the second three-dimensional feature corresponding to the each of the plurality of sample handwriting; and processing, by the offline handwriting individual recognition system, the suspicious handwriting, according to a first probability density distribution data and a second probability density distribution data obtained in advance by using statistics and each of the correlation coefficients, to obtain an individual recognition result of the suspicious handwriting.

11. The offline handwriting individual recognition method of claim 10, wherein the step of processing to obtain a correlation coefficient between the suspicious handwriting and each of the plurality of sample handwritings further comprises:

adding, by the offline handwriting individual recognition system, the first dynamic feature and the first three-dimensional feature corresponding to the suspicious handwriting to a first feature vector;

adding, by the offline handwriting individual recognition system, the second dynamic feature and the second three-dimensional feature corresponding to the each of the plurality of sample handwritings to a second feature vector, the second feature vector comprising a plurality of second feature vectors arranged in rows and columns, each of the plurality of second feature vectors corresponding to the second dynamic feature and the second three-dimensional feature of the each of the plurality of sample handwritings;

combining, by the offline handwriting individual recognition system, the first feature vector and each of the plurality of second feature vectors in pairs to generate a plurality of vector pairs;

performing, by the offline handwriting individual recognition system, dynamic time warping between the first feature vector and the second feature vector in each of the plurality of vector pairs, so that strokes corresponding to the first feature vector and corresponding parts thereof correspond to strokes corresponding to the second feature vector and corresponding parts thereof; and calculating, by the offline handwriting individual recognition system, a correlation coefficient between the first feature vector and the second feature vector in each of the plurality of vector pairs having subjected to the dynamic time warping.

12. The offline handwriting individual recognition method of claim 11, wherein dynamic time wrapping between the first feature vector and the second feature vector in each of the plurality of vector pairs by using dynamic time warping technique is performed, so that strokes corresponding to the first feature vector and corresponding parts thereof correspond to strokes corresponding to the second feature vector and corresponding parts thereof.

13. The offline handwriting individual recognition method of claim 10, wherein the step of processing to obtain an individual recognition result of the suspicious handwriting further comprises:

performing a mean value processing, by the offline handwriting individual recognition system, on all of the correlation coefficients corresponding to the suspicious handwriting to obtain a mean value correlation coefficient corresponding to the suspicious handwriting;

calculating, by the offline handwriting individual recognition system, a first probability of the mean value correlation coefficient in the first probability density distribution data, and calculating a second probability of the mean value correlation coefficient in the second probability density distribution data;

wherein the first probability refers to a probability that the suspicious handwriting corresponding to the mean value correlation coefficient and the sample handwritings are written by the same person, and the second probability refers to a probability that the suspicious handwriting corresponding to the mean value correlation coefficient and the sample handwritings are not written by the same person;

calculating, by the offline handwriting individual recognition system, a ratio of the first probability to the second probability to obtain a likelihood ratio of the suspicious handwriting; and performing, by the offline handwriting individual recognition system, matching in a preset likelihood ratio scale according to the likelihood ratio to obtain an individual recognition result of the suspicious handwriting.

* * * * *